United States Patent [19]

Zamaria

[11] Patent Number: 5,123,187

[45] Date of Patent: Jun. 23, 1992

[54] COMBINED SNOW SCOOP AND MULTIPURPOSE HANDCART

[76] Inventor: Charles Zamaria, 5028 Northern Lights Circle, Mississauga, Ontario, Canada, L5R 2P5

[21] Appl. No.: 718,752

[22] Filed: Jun. 21, 1991

[30] Foreign Application Priority Data

Mar. 28, 1991 [CA] Canada ................. 2039483

[51] Int. Cl.⁵ .......................................... E01H 5/02
[52] U.S. Cl. ............................... 37/265; 37/130; 37/285; 280/47.21; 280/47.26; 294/54.5
[58] Field of Search ............. 37/265, 285, 130; 280/43.1, 47.26, 47.21; 294/54.5

[56] References Cited

U.S. PATENT DOCUMENTS

| 961,843 | 6/1910 | Compton | 37/130 |
|---|---|---|---|
| 1,683,732 | 9/1928 | Selin | 294/54.5 X |
| 2,577,290 | 12/1951 | Underwood | 280/47.26 X |
| 2,598,952 | 6/1952 | Weingart | |
| 2,636,627 | 4/1953 | Stoker | 280/47.26 |
| 2,852,873 | 9/1958 | Benz | 37/130 |
| 2,930,152 | 3/1960 | Pipkin | 37/130 |
| 3,166,339 | 1/1965 | Earley | 280/47.26 |
| 3,475,838 | 11/1969 | Hagen et al. | 37/130 |
| 3,583,746 | 6/1971 | Lissakers | 294/54 |
| 3,661,414 | 5/1972 | Roth | 294/59 |
| 3,751,058 | 8/1973 | Larsen | 280/30 |
| 4,222,585 | 9/1980 | Crothers | 280/654 |
| 4,629,203 | 12/1986 | Ballard | 37/265 X |
| 4,697,834 | 10/1987 | Scott | 294/55 |
| 4,804,219 | 2/1989 | Berg | 294/54.5 |

Primary Examiner—Randolph A. Reese
Assistant Examiner—Arlen L. Olsen
Attorney, Agent, or Firm—Michael M. Sakovich

[57] ABSTRACT

A general purpose handcart having utility as either a snow scoop or a lawn and garden cart includes a trough shaped receptacle having a pair of side walls, a rear wall closing one end of the receptacle and an open end that is provided with a cable controlled, pivotally mounted, shutter for selectively opening and closing frontal access to the receptacle. Attached to the receptacle in a reinforcing relationship, a "U" shaped handle is used for either pushing or pulling the receptacle. A hoop adapted to support a refuse bag is pivotally mounted on the handle adjacent the receptacle. Mounted one on either side of the receptacle, a pair of retractable wheels are positioned forwardly to rollably support the receptacle when used as a cart, or rearwardly at a retracted position to permit using the receptacle as a slidable snow scoop.

14 Claims, 4 Drawing Sheets

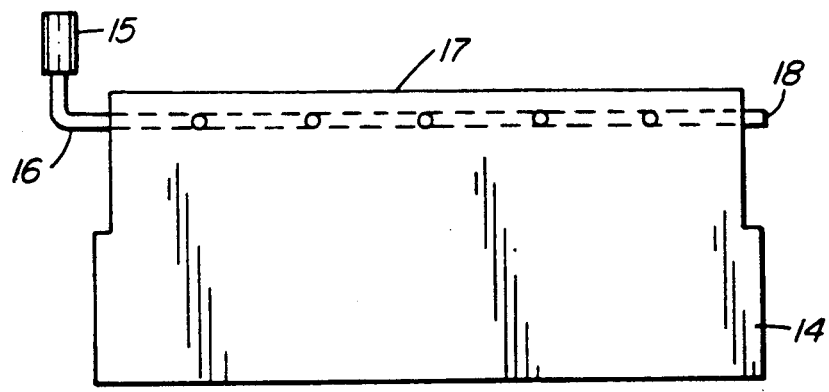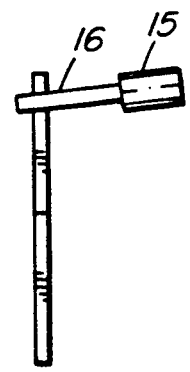
FIG. 8   FIG. 9
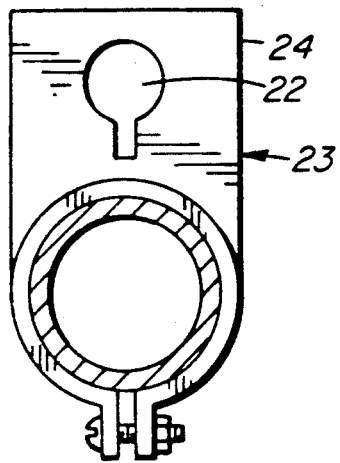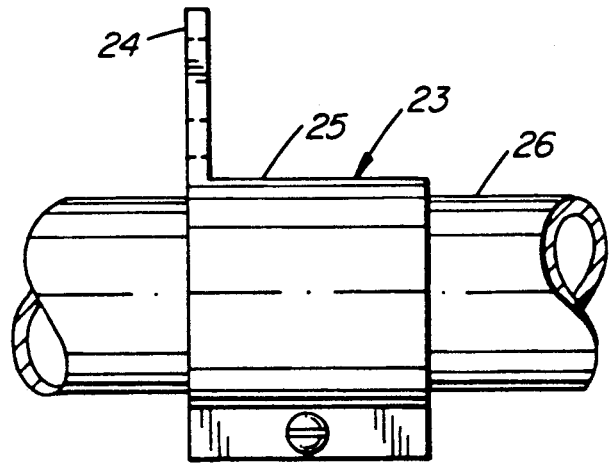
FIG. 10   FIG. 11
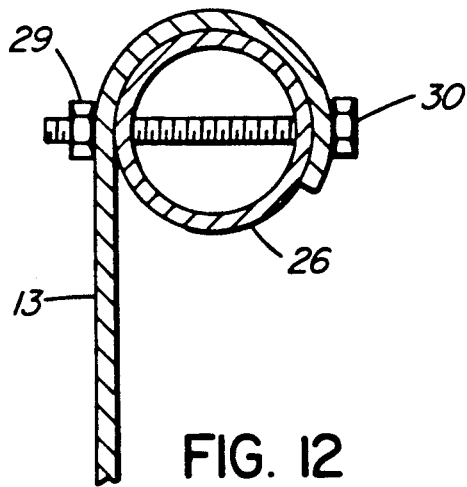
FIG. 12

COMBINED SNOW SCOOP AND MULTIPURPOSE HANDCART

FIELD OF THE INVENTION

This invention relates to a cart and more particularly to a multiseasonal cart having utility as a slidable snow scoop and a general purpose wheeled handcart.

BACKGROUND OF THE INVENTION

Multipurpose carts that are useful as either snow scoops or general purpose handcarts are known. Such a cart is typified in U.S. Pat. No. 3,751,058 which issued on Aug. 7, 1973, to Bjorn Arild Larsen. Larsen discloses a typical snow scoop having a trough-shaped container with a closed trailing end and an open leading end, and a "U" shaped handle attached to the container by means of which the container may be either pushed or pulled. A transverse axle lies on the floor of the container at the closed end and extends outwardly of a pair of opposing side walls to accommodate a wheel on each side thereof. In its wheeled mode, the Larsen device may be utilized as a wheelbarrow or a dolly. With the wheels removed, the device is conventionally used as a slidable snow scoop.

Anticipated problems with the Larsen device center about the pair of removable wheels. As may be expected, since the wheels are not carried on the device and because of the relatively long intervals of time between seasonal changes that require either the installation or removal of the wheels, it is likely that the wheels will be at least temporarily mislaid, thus necessitating a search. Under the usual cluttered conditions that commonly occur in garages, locating the wheels may thus be problematic and time consuming.

Another difficulty may occur during the early stages of winter when snow removal from walkways leaves relatively clear pavement behind that will abrade the sliding surface of the snow scoop, thereby resulting in a shortened service life. Depending upon ambient temperature conditions, and the amount of solar exposure, this type of snow removal condition may recur frequently throughout the winter months. Even though this potential problem may be overcome by not remove the wheels of the Larsen device during the winter months, a user would then be required to expend extra effort during snow removal in order to overcome the resistance of the snow traversed by the wheel assembly.

When used as a wheelbarrow during the warm months of the year, the Larsen device could be difficult to move under soft soil conditions, especially if its outstanding wheels sink deeply into the soil. This difficulty could be readily avoided by simply removing the wheels, but then this would necessitate extra effort; probably in a location and under circumstances not conducive to removing the wheels. A typical setting may be in a wet and muddy garden plot where a skidding action rather than that of rolling is more conducive to easy movement of the device.

SUMMARY OF THE INVENTION

Having regard to the aforedescribed problems relating to handcarts that may double as snow scoops, one provision of the present invention is to avoid the problem of rolling resistance by providing a combined snow scoop and multipurpose handcart apparatus having retractable wheels.

Another provision of the invention is a combined snow scoop and multipurpose handcart apparatus that includes a closure device mounted on a forward open end of a receptacle for selectively opening and closing access thereto.

A further provision of the invention are means mounted on a handle of the apparatus for supportably carrying a refuse container in positionable engagement with the receptacle for easy transfer of its contents into the refuse container.

Still another provision of the invention are actuation means for remotely operating the closure means while pushing or pulling the apparatus.

The problems associated with the prior art may be substantially overcome and the foregoing provisions achieved by recourse to the invention which is a combined snow scoop and multipurpose handcart apparatus that comprises in combination, a receptacle having a bottom wall, a pair of opposing side walls, a transverse rear wall joining the side and bottom walls, and an open front end, a handle attached to the receptacle in reinforcing relation therewith for selectively pushing and pulling the apparatus, and wheel means retractably mounted on the receptacle for rollably supporting the apparatus in selected ones of a plurality of wheel positions.

BRIEF DESCRIPTION OF THE DRAWINGS

The invention will now be more particularly described with reference to embodiments thereof shown, by way of example, in the accompanying drawings in which:

FIG. 8 is a front elevation view of a shutter in accordance with the invention;

FIG. 9 is a side elevation view of the shutter of FIG. 8;

FIG. 10 is a front elevation view of a shutter control bracket in accordance with the invention;

FIG. 11 is a side elevation view of the bracket of FIG. 10; and

FIG. 12 is a cross-sectional view of FIG. 3 taken along the lines 12—12.

DETAILED DESCRIPTION OF THE PREFERRED EMBODIMENTS

Figures 1, 1A:
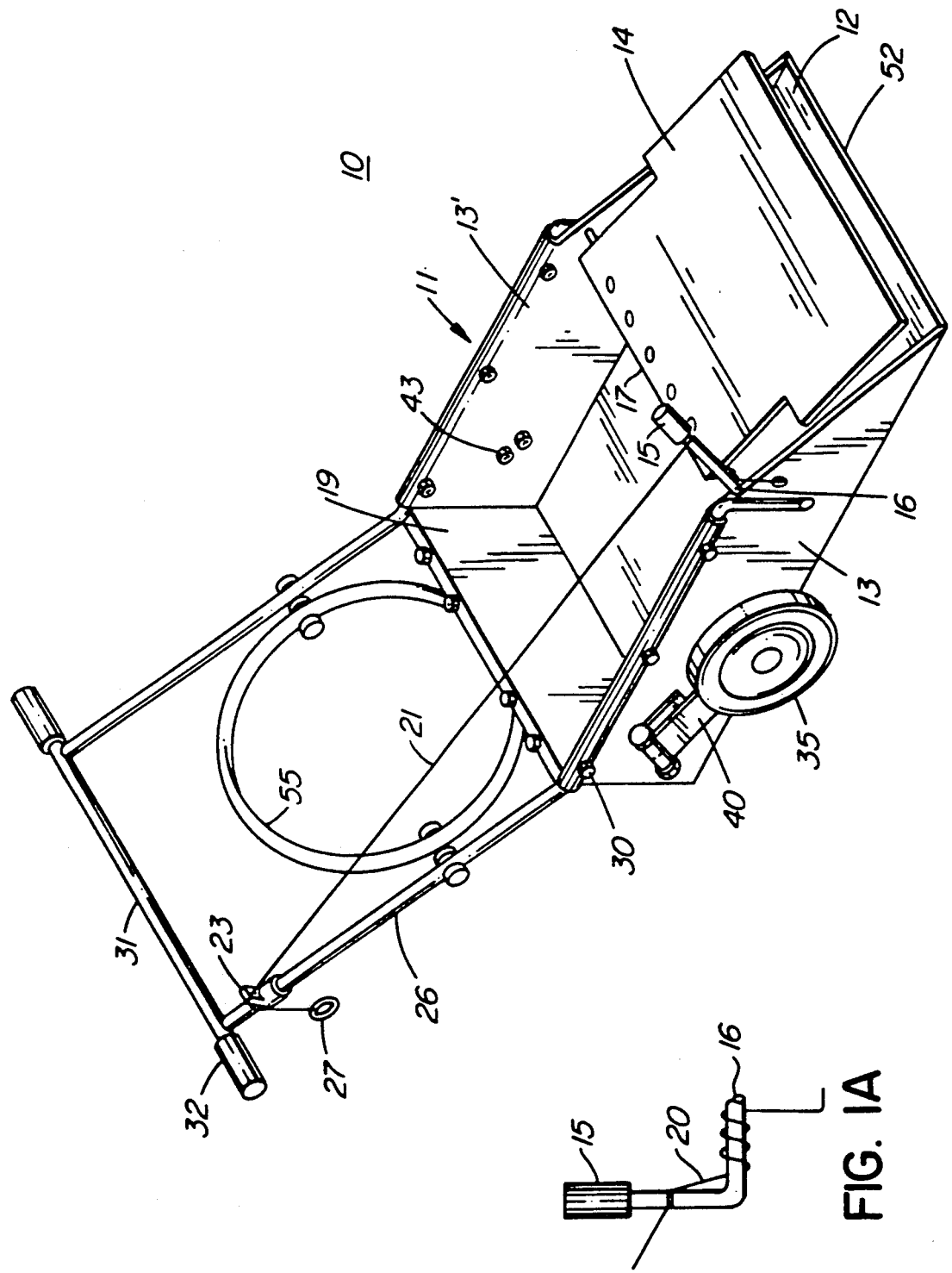
FIG. 1 is a perspective view of a combined snow scoop and multipurpose handcart apparatus in accordance with the present invention.
FIG. 1A is an enlarged view of a lever shown in the apparatus of FIG. 1.

A perspective view of a combined snow scoop and multipurpose handcart apparatus 10 is illustrated in FIG. 1. The apparatus 10 will be seen to include a receptacle, shown as a bin 11 having a flat bottom wall 12, a pair of opposing side walls 13 and 13' that are upstanding and disposed in substantial parallel relation, and a transverse rear wall 19 that joins the side walls 13 and the bottom wall 12.

The front end of the bin 11 is shown to be open. However, it will be understood that the open end may be readily closed using closure means as illustrated, namely a shutter 14 that is pivotally mounted at the open end of the bin transversely of the side walls 13.

Actuation of the shutter to either a closed or open position occurs by way of a lever 15 that forms part of a reinforcing pivot bar 16 to which the shutter 14 is attached. Such attachment occurs alongside an uppermost edge 17 of the shutter as illustrated, and may be effected by means of sheet metal screws or by spot welding for example. An extending free end 18 of the bar 16 is rotatably journalled in its corresponding side wall 13'. Similarly, the other end of the bar 16 is journalled in its corresponding side wall 13 as may be understood from FIGS. 1 and 8.

Normally the shutter 14 remains closed under a constraining force exerted by a coil spring 20 which is shown connected between the lever 15 and an anchor point on the side wall 13. Having regard to FIGS. 1 and 3, it will be understood that the shutter 14 may be opened by actuation means comprising a flexible cable 21 having a free end attached to the lever 15. Thus, by pulling the cable 21, the constraining force of the spring 20 is overcome, causing the bar 16 to rotate which opens the shutter 14. A fully open position of the shutter may be maintained by locking a distal end of the cable 21 within a keyhole slot 22 of a bracket 23 as may be seen in FIGS. 10 and 11. Reference to these figures shows that the bracket 23 comprises an upstanding end wall 24, in which the slot 22 is formed, and a tubular clamp member 25 which is adapted to be clamped to a handle 26 of the apparatus 10. Although not fully illustrated, it will be understood that the cable 21 may be locked within the slot 22 by means of a split shot (not shown), or the like, clamped to the cable at a position corresponding to the shutter 14 being held in its fully open position. A ring 27 connected to the free end of the cable 21 provides a convenient grip for engaging the cable with or releasing it from the slot 22.

Figure 3:
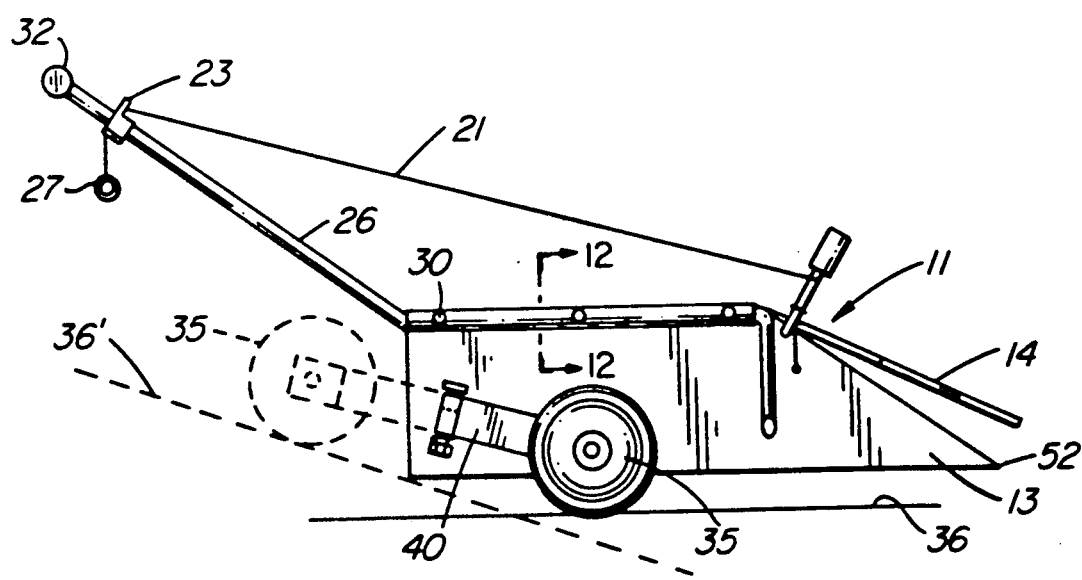
FIG. 3 is a side elevation view of the apparatus of FIG. 1.

The handle 26 is attached to the bin 11 adjacent the uppermost edge of the side walls 13 as best seen in FIGS. 1 and 3. The handle 26 is capable of either pushing, pulling or tilting the apparatus 10 due in large measure to its reinforcing relationship with the bin 11. Such reinforcement arises from the inherent strength of a tubular member and is further enhanced by the uppermost edge of the side walls 13 being at least partially wrapped circumferentially at least mid-way around a corresponding length of the handle 26. As may be seen in FIGS. 1, 3 and 12, the wrapped portion of the side walls 13 is attached to the handle 26 by fastening means such as nuts 29 and machine screws 30 or by spot welding (not shown), either one of which would be acceptable. However, since the apparatus 10 would likely be marketed in a disassembled state, screw fasteners would be preferable since this would facilitate reducing the apparatus 10 to its component parts instead of subassemblies.

Figure 2:
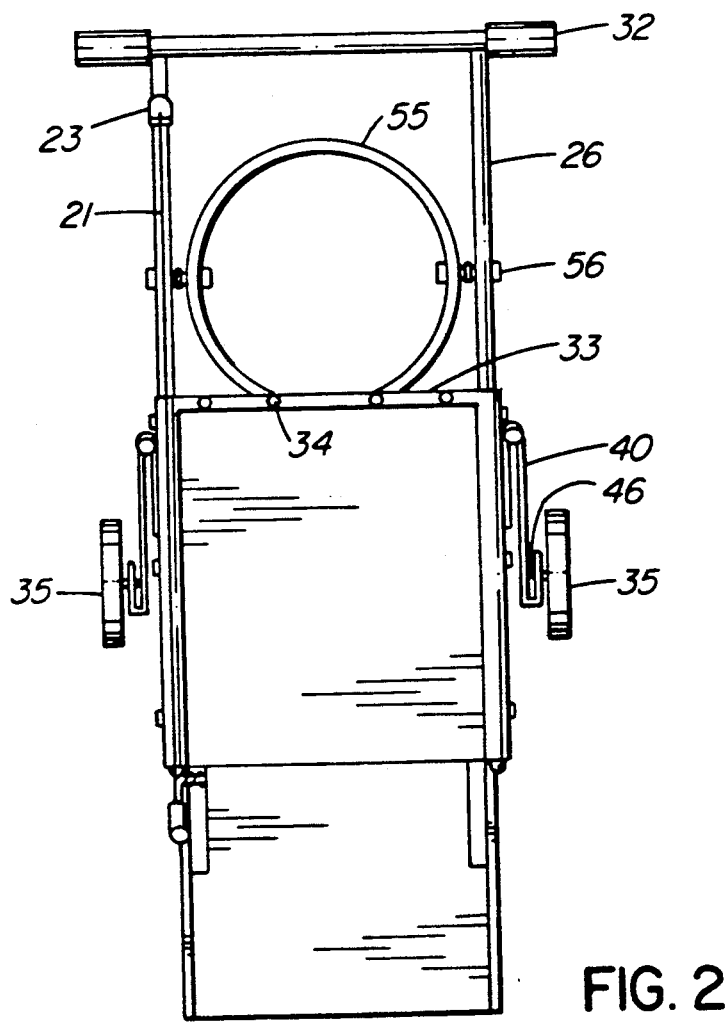
FIG. 2 is a top plan view of the apparatus of FIG. 1.

Referring again to FIGS. 1-3, it will be observed that the handle 26 has an upwardly and outwardly extending portion which terminates in a first crossbar 31 having extending free ends on which are mounted a pair of hand grips 32. FIG. 2 illustrates the position of a second crossbar 33 that is attached by means of sheet metal screws 34 alongside an uppermost edge of the rear wall 19 to provide improved lateral stability for the apparatus 10. As in the case of the attachment of the side walls 13 to the side members of the handle 26, the uppermost edge of the rear wall 19 is likewise wrapped at least partially around the crossbar 33.

Wheels 35 permit the apparatus 10 to be used as a multipurpose handcart. As illustrated in FIGS. 1-3, the wheels 35 are positioned near the center of gravity of the apparatus 10 in order to provide a good balance when empty, and to carry a substantial part of the load when the bin 11 is full. FIG. 3 shows the approximate attitude of the apparatus 10 relative a supporting plane 36 as well as the optimal position of the wheels 35 with respect to the bin 11.

When the apparatus 10 is used as a snow scoop, the wheels 35 are advantageously retracted to a position behind the bin 11 and closer to a plane 36' as shown in broken line form in FIG. 3. Not only are the wheels behind the bin 11, the wheels 35 are positioned inwardly of the side walls 13 to avoid interfering engagement with the snow as the apparatus 10 is worked as a scoop. As a result, the wheels 35 are now advantageously positioned to improve mobility of the apparatus when traversing substantially bare pavement with the bin filled with snow. Moreover, the retracted position of the wheels permits pulling the apparatus over a snow covered surface without interference from the wheels 35 having regard to the higher position of the wheels relative the supporting plane 36.

Figure 4:
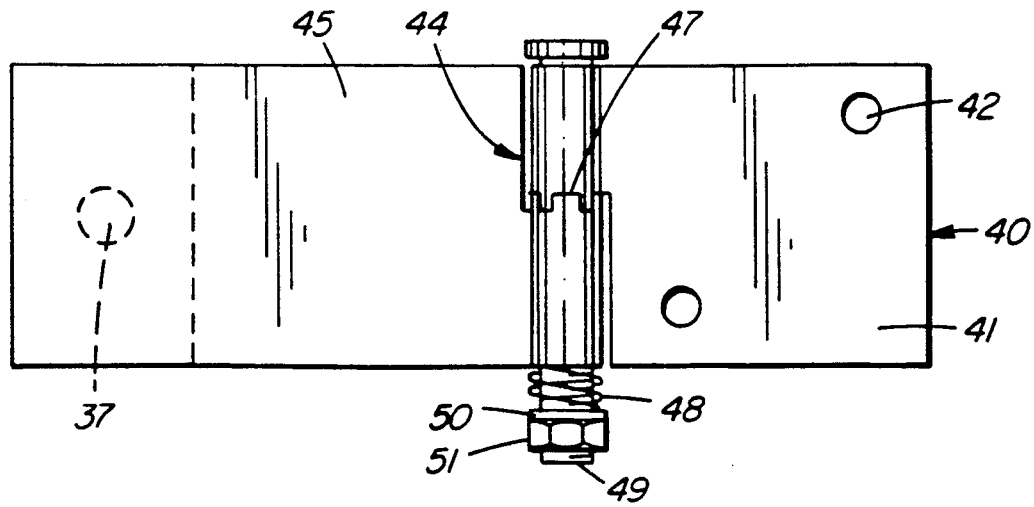
FIG. 4 is a side elevation view of an extended, hinged wheel strut in accordance with the invention.
Figure 5:
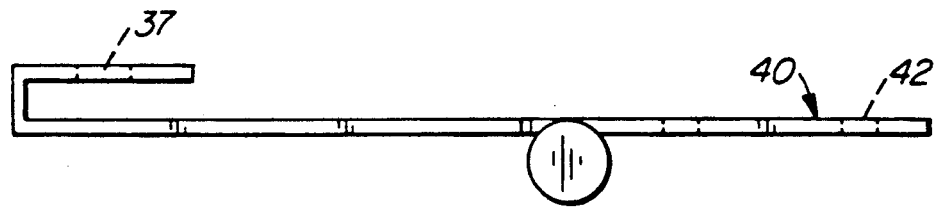
FIG. 5 is a top plan view of the strut of FIG. 4.

The advantageous features of the retractable wheels arise from a hinged wheel strut 40 shown in enlarged detail in FIGS. 4-7. A side elevation view in FIG. 4 shows the strut 40 extended to its retracted position and, together with FIG. 5, reveals a first hinge member 41 having two diagonally positioned apertures 42 by means of which the member 41 may be attached to a corresponding side wall 13 using known fastening means (not shown) such as machine screws and nuts. Passage of the screws (not shown) through the apertures 42 and corresponding apertures 43 in the side walls 13 securely mounts the strut 40 onto the bin 11.

A second hinge member 45 of the strut has attached on its distal end a wheel 35 as illustrated in FIG. 2. Known fastening means such as a bolt and nut, shown generally at 46 (FIG. 2), rotatably mount a wheel 35 on the member 45. In this arrangement the bolt would pass through an aperture 37 to engage the nut.

Figure 6:
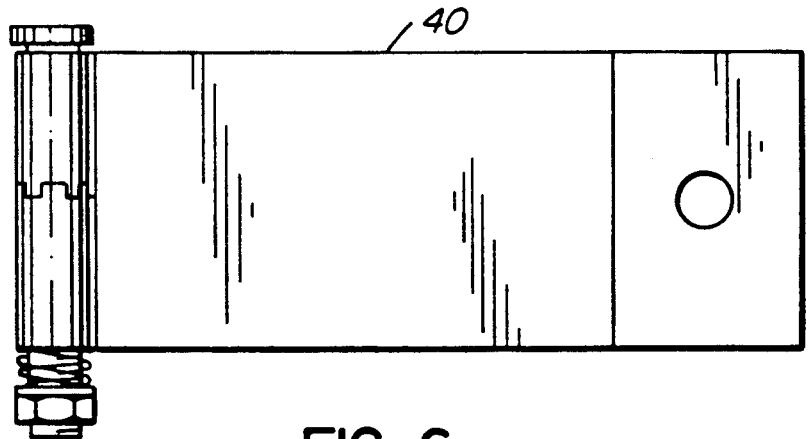
FIG. 6 is a side elevation view of the strut of FIG. 4 shown in a folded position.
Figure 7:
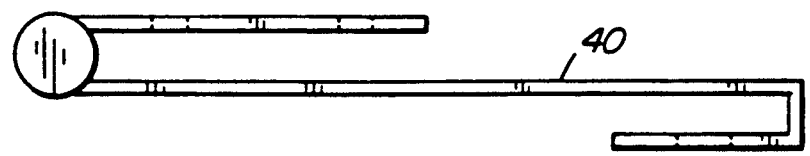
FIG. 7 is a top plan view of the folded strut of FIG. 6.

The strut 40 is held locked in its open, rearwardly retracted position according to FIG. 4 by means of a castellated hinge 44. As illustrated in FIGS. 4 and 6, a castellated interface 47, having complementary engaging serrations, serves to lock the members 41 and 45 in either one of two positions, the strut 40 being retractably extended rearwardly as in FIG. 4, or folded forwardly as illustrated in FIGS. 6 and 7.

The respective locked positions may be unlocked by forcing the member 45 downwardly (FIG. 4) to overcome the constraining force created by a coiled spring 48 that is coaxially disposed about a free end of a threaded hinge pin 49 and which is held between the member 45 and a washer 50 by means of a nut 51. Sufficient pressure causes separation of the castellated interface 47. The member 45 may then be folded forwardly towards the front of the bin 11 and thereafter released, whereupon reengagement of the interface 47 occurs and the folded position of the strut 40 is assumed as illustrated in FIGS. 6 and 7. It will be observed that the folded position of the strut 40 is likewise shown in FIGS. 1-3.

FIG. 3 shows a long axis of the hinge pin 49 as being tilted forwardly so that the distal end of the member 45, when in its forward position, is disposed near the plane 36. However, when the distal end is in its retracted position, as shown in broken line form, it is disposed at a higher level above the plane 36. In this way the wheels 35 may be positioned forwardly to rollably support the bin 11 as described or rearwardly to permit the bin to slide upon a surface corresponding to the plane 36.

It will be understood that the strut 40 as illustrated in FIGS. 4-7 is intended to be mounted on the side wall 13 so that the downward forces generated by a load carried in the bin 11 act to maintain the castellated interface 47 in engagement. Producing the same effect on the wall 13', however, will require a mirror image arrangement of the members 41 and 45 on that side. Thus, a separate left and right wheel strut 40 is required.

When used as a handcart, the wheels 35 are optimally positioned so that a leading edge 52 of the open end rests on the supporting plane 36. This permits raking debris conveniently into the bin 11 when the shutter 14 is opened. When shovelling debris or soil into the bin 11, the shutter 14 may be kept either open or closed.

Disposal of debris contained within the bin 11 is facilitated using a hoop 55 that is pivotally mounted between the side members of the handle 26 as illustrated in FIGS. 1 and 2. The pivotal mount, shown generally at 56, is conventional and may comprise a nut and bolt with a washer disposed between the hoop and the handle 26 as illustrated. The purpose of the hoop 55 is to accommodate a refuse bag (not shown) that would be clipped thereto to maintain the bag in an open condition ready to receive the debris contained within the bin 11. Using suitable fasteners, not shown, such as "U" shaped clips or short sections of resilient channel that frictionally engage the hoop 55 and the periphery of an open refuse bag in holding arrangement, the bag may be conveniently carried within the bin 11 when raking up debris such as grass clippings from a freshly mown lawn.

To those skilled in the art to whom this specification is addressed, it will be apparent that the embodiments aforedescribed may be varied to meet particular specialized requirements without departing from the true spirit and scope of the invention disclosed. For example, the walls of the bin 11 may be fabricated from thin sheet metal. Alternatively, the bin 11 may be molded as an integral unit from a suitable plastic such as polyethylene. These embodiments are therefore not to be taken as indicative of the limits of the invention but rather as exemplary structures of the invention which is described by the claims appended hereto.

The embodiments of the invention in which an exclusive property or privilege is claimed are defined as follows:

1. A combined snow scoop and multipurpose handcart apparatus, comprising in combination:
    a receptacle having a bottom wall, a pair of opposing side walls, a transverse rear wall joining the side and bottom walls and an open front end;
    a handle attached to the receptacle in reinforcing relation therewith for selectively pushing and pulling the apparatus;
    wheel means for rollably supporting the apparatus in selected ones of a plurality of wheel positions; and
    wheel strut means for retractably mounting the wheel means on the receptacle, the wheel strut means including a first hinge member adapted to be fixedly mounted on an exterior surface of each side wall, a corresponding second hinge member having a proximate end hingedly connected to the first hinge member and a distal end adapted to rotatably mount a wheel, a castellated interface comprising complementary serrations between each pair of hinge members, and means for releasably locking each pair of hinge members in selected ones of the said plurality of wheel positions by holding the complementary serrations in releasably locked engagement.

2. Apparatus as claimed in claim 1, further comprising closure means pivotally mounted on the open end of the receptacle transversely of the side walls for selectively opening and closing frontal access to the receptacle.

3. Apparatus as claimed in claim 2, further comprising means mounted on the handle for supportably carrying a refuse container.

4. Apparatus as claimed in claim 3, further comprising means for constraining the closure means in normally closed relation with the open end of the receptacle.

5. Apparatus as claimed in claim 4, further comprising actuation means connected between the handle and the closure means for remotely opening and closing the closure means from the handle.

6. Apparatus as claimed in claim 5, wherein the reinforcing relation between the handle and the receptacle comprises an upstanding free edge portion of each side wall wrapped peripherally about a longitudinal portion of the handle positioned adjacent each said free edge portion and attached thereto with fastening means.

7. Apparatus as claimed in claim 6, wherein the handle comprises a tube and the free edge portion of each side wall is wrapped circumferentially at least mid-way about each one of said longitudinal portions of the handle.

8. Apparatus as claimed in claim 7, wherein the handle further comprises a tubular crossbar having free ends connected to the said longitudinal portions of the handle, the crossbar being positioned adjacent an upstanding free edge portion of the transverse rear wall which is wrapped circumferentially at least mid-way about the crossbar and which is attached thereto with fastening means.

9. Apparatus as claimed in claim 1, further comprising a hinge pin on which the first and second hinge members are hingedly mounted and wherein the means for holding the complementary serrated surfaces in releasable engagement comprises a spring exerting a constraining force between one end of the pin and the second hinge member.

10. Apparatus as claimed in claim 9, wherein the receptacle walls are fabricated from thin sheet metal.

11. Apparatus as claimed in claim 9, wherein the receptacle is molded from plastic as an integral unit.

12. Apparatus as claimed in claim 11, wherein the plastic is polyethylene.

13. Apparatus as claimed in claim 9, wherein the second hinge member is lockable in a retracted position relative the first hinge member whereby both members are axially extended, and in a forward position whereby the second hinge member is folded in overlying relation with the first hinge member.

14. Apparatus as claimed in claim 13, wherein the long axis of the hinge pin is tilted forwardly, whereby the distal end of the second hinge member is positioned in a first horizontal plane when in the forward position, and in a vertically higher second horizontal plane when in the retracted position.

* * * * *